United States Patent
Ma et al.

(10) Patent No.: US 12,478,608 B2
(45) Date of Patent: Nov. 25, 2025

(54) USE OF SLOW-RELEASING HYDROGEN SULFIDE ORGANIC DONOR ADT-OH IN THE PREPARATION OF DRUGS FOR TREATING NERVOUS SYSTEM DISEASES

(71) Applicant: SOOCHOW UNIVERSITY, Suzhou (CN)

(72) Inventors: Yanxia Ma, Suzhou (CN); Shanwen Wei, Suzhou (CN); Mingming Zou, Suzhou (CN); Li Ni, Suzhou (CN); Liyu Zhou, Suzhou (CN); Di Li, Suzhou (CN); Yanwei Yang, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 0 days.

(21) Appl. No.: 17/912,638

(22) PCT Filed: Oct. 9, 2021

(86) PCT No.: PCT/CN2021/122752
§ 371 (c)(1),
(2) Date: Sep. 19, 2022

(87) PCT Pub. No.: WO2023/035348
PCT Pub. Date: Mar. 16, 2023

(65) Prior Publication Data
US 2023/0355576 A1 Nov. 9, 2023

(30) Foreign Application Priority Data
Sep. 7, 2021 (CN) .......................... 202111044116.1

(51) Int. Cl.
A61K 39/395 (2006.01)
A61K 31/385 (2006.01)
A61K 35/30 (2015.01)
A61P 25/00 (2006.01)
C12N 5/079 (2010.01)

(52) U.S. Cl.
CPC ............ *A61K 31/385* (2013.01); *A61K 35/30* (2013.01); *A61P 25/00* (2018.01); *C12N 5/0622* (2013.01)

(58) Field of Classification Search
None
See application file for complete search history.

(56) References Cited

FOREIGN PATENT DOCUMENTS

| CN | 102078327 A | * | 6/2011 |
| CN | 108398549 A | | 8/2018 |
| CN | 110776448 A | | 2/2020 |

OTHER PUBLICATIONS

Cai et al. "ADT-OH, a hydrogen sulfide-releasing donor, incudes apoptosis and inhibits the development of melanoma in vivo by upregulating FADD", Cell Death & Disease, 11:33 (Year: 2020).*
Hongwei Yang et al., "Protective effect of endogenous hydrogen sulfide on neuronal damage" China Foreign Medical Treatment, 2013, No. 5, pp. 188, 190 (Feb. 11, 2013).
Zhengwei Dai et al., "Research progress of hydrogen sulfide and glial cell function" Chinese Journal of Gerontology, vol. 31, No. 06, pp. 1072-1074 (Mar. 25, 2011).
Yuyao Li et al., "Synthesis and Activity of Hydrogen Sulfide Donor ADT-OH Derivatives" Journal of China Pharmaceutical University, 2017, 448(3), pp. 276-281 (Jun. 25, 2017).
Yiyun Tang et al., "Research progress on the neurobiological effects of hydrogen sulfide" Progress in Physiological Sciences, 2017, vol. 48, No. 1, pp. 42-51 (Feb. 25, 2017).
Liyu Zhou et al., "Regulation of neural precursor cell proliferation by hydrogen sulfide sustained-release donor ADT-OH" Chinese Journal of Tissue Engineering Research, vol. 25, No. 1, pp. 96-100 (Jan. 31, 2021).

* cited by examiner

*Primary Examiner* — Susan T Tran
(74) *Attorney, Agent, or Firm* — SZDC Law PC

(57) ABSTRACT

The present invention relates to use of slow-releasing hydrogen sulfide organic donor ADT-OH drugs in the differentiation of neural precursor cells. ADT-OH can induce more directed differentiation of neural precursor cells into neurons and oligodendrocytes and less differentiation into astrocytes, promote the axon growth of neurons, and reduce the death of neural precursor cells, thereby providing a direction for the transplantation of neural precursor cells to repair damaged nerves. ADT-OH will likely become a new drug target for the clinical treatment of nervous system diseases.

8 Claims, 2 Drawing Sheets

USE OF SLOW-RELEASING HYDROGEN SULFIDE ORGANIC DONOR ADT-OH IN THE PREPARATION OF DRUGS FOR TREATING NERVOUS SYSTEM DISEASES

This application is the National Stage Application of PCT/CN2021/122752, filed on Oct. 9, 2021, which claims priority to Chinese Patent Application No. 202111044116.1, filed on Sep. 7, 2021, which is incorporated by reference for all purposes as if fully set forth herein.

FIELD OF THE INVENTION

The present invention relates to the field of biological cytology and regenerative medicine, and in particular, to use of slow-releasing hydrogen sulfide organic donor ADT-OH in the preparation of a drug for the treatment of a nervous system disease.

DESCRIPTION OF THE RELATED ART

Neural stem cells, also known as neural precursor cells (NPCs), are cells with pluripotency of differentiation. During the development of the central nervous system (CNS), the subventricular zone is a main area where NPCs are distributed. NPCs can maintain their own cell count by symmetrical division, Neurons, astrocytes and oligodendrocytes can also be produced by asymmetric division. In the mammalian nervous system, neurons are terminally differentiated cells, cannot divide again to produce new cells by themselves, so neurons can't be replenished after death. The neural stem cells are fewer in the adult mammalian nervous system, and generally insufficient to compensate for neuronal death caused by nerve injury or disease. Because of such a defect of neurons, nervous system damage or disease will cause irreversible loss of sensation, motor or cognitive functions. Therefore, how to produce new neurons and allow them to form a functional loop again is an important goal in current neuroscientific research and in clinical treatment of nerve injury repair and regeneration in future.

After nerve injury, some glial cells, such as astrocytes, can be reactivated and divided rapidly after damage, to realize the replenishment of cells. However, these newly produced astrocytes are often a main component of scar tissues that inhibits the axonal regeneration after nerve injury. Oligodendrocytes are cells myelinating axon, and are generally replenished by the division and differentiation of precursor cells after injury. However, the injured nerve tissue has inhibition on the formation of new myelin. Therefore, endogenous oligodendrocytes cannot fully satisfy the formation of new myelin. Therefore, repairing the damaged nervous system and restoring the functions require: 1) replenishment of new neurons, 2) replenishment of new oligodendrocytes, and 3) reduction of astrocytes that form scar tissues.

The transplantation of neural precursor cells to repair the damaged nervous system is an important research direction in the field of neural repair However, current research in this field shows that neural precursor cells transplanted into a damaged site will differentiate into astrocytes in a large number to form glial scars, thus failing to repair the damaged nerves. Therefore, how to induce the transplanted exogenous stem cells into neurons or oligodendrocytes is an important research direction in the field of neuroscience.

Hydrogen sulfide ($H_2S$) is the third known endogenous gas signaling molecule following nitric oxide and carbon monoxide, which is expressed in multiple mammalian organs, particularly the brain. $H_2S$ provides protection against ischemia-reperfusion injury in the liver and other organs. Moreover, it is also involved in different physiological and pathological processes, to regulate the polarization of central microglia from an activated state m1 to an activated state m2, thereby reducing the inflammatory response of the central nervous system, and enhancing the regeneration and repair of damaged brain. Due to the cytoprotection effect of $H_2S$, the physiological functions of cells or organ systems can be restored by artificial modulation of endogenous $H_2S$ or by in-vitro administration of biosynthetic $H_2S$ donors. Therefore, more and more attention is focused on identifying new $H_2S$ donors. Because the sharp rise of the concentration of $H_2S$ in a short period of time is lethal, a donor of slow release is required. 5-(p-hydroxyphenyl)-1,2-dithione-3-thione (ADT-OH) is an organic donor that slowly releases $H_2S$ in vivo. Compared to inorganic $H_2S$ donors such as NaHS, ADT-OH can release $H_2S$ slowly and permanently at a controllable rate, with an effect better than that of ordinary inorganic $H_2S$ donors. ADT-OH releases $H_2S$ molecules in vivo, and provides neuroprotection against glutamate-induced oxidative stress. However, the potential effect of ADT-OH on the differentiation of neural precursor cells is still unclear.

SUMMARY OF THE INVENTION

To solve the above technical problems, the present invention provides new use of slow-releasing hydrogen sulfide organic donor ADT-OH. The material reduces the death of neural precursor cells, and induces more directed differentiation of neural precursor cells into neurons and oligodendrocytes and less differentiation into astrocytes, providing a direction for the transplantation of neural precursor cells to repair damaged nerves. ADT-OH will likely become a new drug target for the clinical treatment of nervous system diseases.

The present invention claims use of slow-releasing hydrogen sulfide organic donor ADT-OH in the preparation of a drug for treating a nervous system disease.

Preferably, the slow-releasing hydrogen sulfide organic donor ADT-OH is used to repair the nervous system. ADT-OH can induce the differentiation of neural precursor cells into neurons and oligodendrocytes and inhibit the differentiation of neural precursor cells into astrocytes.

The present invention also claims use of slow-releasing hydrogen sulfide organic donor ADT-OH in in-vitro differentiation of neural precursor cells.

Preferably, the slow-releasing hydrogen sulfide organic donor ADT-OH is used to induce the differentiation of neural precursor cells into neurons.

Preferably, the slow-releasing hydrogen sulfide organic donor ADT-OH is used to promote the axonal growth of neurons.

Preferably, the slow-releasing hydrogen sulfide organic donor ADT-OH is used to induce the differentiation of neural precursor cells into oligodendrocytes.

Preferably, the slow-releasing hydrogen sulfide organic donor ADT-OH is used to inhibit the differentiation of neural precursor cells into astrocytes.

Preferably, the neural precursor cells are neural precursor cells of neocortex in the embryonic stage, and specifically neural precursor cells in the subventricular zone. In the present invention, neural precursor cells in the subventricular zone in the embryonic stage are used. The neural stem cells are fewer in the adult mammalian nervous system, and generally insufficient to compensate for neuronal death caused by nerve injury or disease. A small number of neural precursor cells in the subventricular zone in adult mammalian can also be differentiated into neurons and glial cells. However, it is difficult to achieve the effect of repairing nerve damage due to the insufficient count.

Neural precursor cells in the subventricular zone are also known as neural stem cells, are cells capable of self-renewal and having pluripotency of differentiation, and can proliferate or differentiate into neurons and glial cells. Prior to day 12 of embryonic development, neural precursor cells proliferate considerately to form a cell pool, providing conditions for the subsequent development of the cerebral cortex. To rule out ethical issues, when applied in human body, human neural precursor cells obtained with the approval of ethical review are used in the present invention, including commercialized human neural precursor cells (for example, NHNP—Human Neural Progenitor Cells, HopCell™, and so on). It is to be noted that the neural precursor cells used in the present invention cannot develop into an intact individual.

A method for inducing the differentiation of neural precursor cells is provided, which comprises the following steps:

culturing the neural precursor cells in a neural precursor cell culture medium containing ADT-OH for 1-3 days, and then inductively culturing in a differentiation medium containing ADT-OH for 5-8 days.

The concentration of ADT-OH in the neural precursor cell culture medium containing ADT-OH is 70-90 μmol/L, the concentration of ADT-OH in the differentiation medium containing ADT-OH is 70-90 μmol/L, the neural precursor cell culture medium is DMEM-F12 medium containing B27, bEGF and FGF, and the differentiation medium is DMEM-F12 medium containing FBS and B27.

Preferably, a tissue is taken from the subventricular zone in the embryonic stage, trypsinized, and terminated with the neural precursor cell culture medium, to obtain free neural precursor cells; and the pellet is collected, added to the neural precursor cell culture medium, then inoculated in a cell culture plate and cultured for 3-4 days, to obtain the neural precursor cells.

Preferably, the concentration of ADT-OH is 80 μmol/L.

By virtue of the above solutions, the present invention has at least the following advantages.

To solve the current problem of how to induce the directed differentiation and survival of neural precursor cells, ADT-OH drug is innovatively used to treat the neural precursor cells cultured in vitro in the present invention, and a drug and method for inducing the directed differentiation and survival of neural precursor cells are provided, to enable more differentiation of neural precursor cells into neurons and oligodendrocytes required for repair of nerve damage and less differentiation into astrocytes, and reduce the death of neural precursor cells, laying a foundation for the transplantation of neural precursor cells to repair damaged nerves.

The above description is only a summary of the technical solutions of the present invention. To make the technical means of the present invention clearer and implementable in accordance with the disclosure of the specification, the preferred embodiments of the present invention will be described in detail with reference to the accompanying drawings.

BRIEF DESCRIPTION OF THE DRAWINGS

To make the disclosure of the present invention more comprehensible, the present invention will be further described in detail by way of specific embodiments of the present invention with reference the accompanying drawings, in which.

DETAILED DESCRIPTION OF THE PREFERRED EMBODIMENTS

Figure 1:
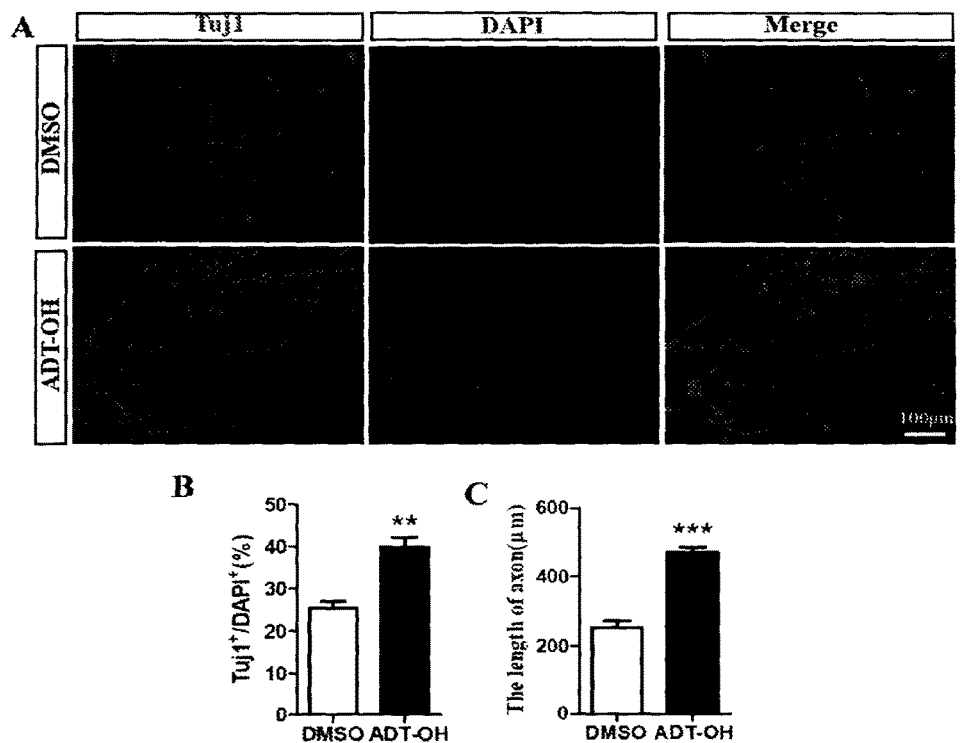
FIG. 1 shows the effect of ADT-OH on the differentiation of neurons, where A shows staining of Tuj1 cells, B shows a statistical graph of neuron differentiation ratio, and C shows the quantitative result of axonal length of neurons.

The present invention will be further described below with reference to the accompanying drawings and specific examples, so that those skilled in the art can better understand and implement the present invention; however, the present invention is not limited thereto.

Example 1

(1) Adult ICR mice (male:female 2:1) were allowed to mate randomly. At 8:00 every night, the male and female mice were co-caged. On the following day, if a female mouse had a vaginal plug at 8 am, it means that the mating was successful, and this day was recorded as the first day of pregnancy of the mouse. On day 14.5 of pregnancy of the mice, neural precursor cells were extracted.

C57BL/6J mice at day 14.5 of pregnancy were anesthetized with 4% chloral hydrate by intraperitoneal injection. The abdominal cavity of the pregnant mice was opened using sterile surgical scissors and surgical forceps, the uterus of the pregnant mice was opened and the fetal brain was taken out. The fetal brain tissue in the subventricular zone was isolated under a stereomicroscope, digested with 0.05% trypsin in a water bath at 37° C. for 10 min, and then terminated with a neural precursor cell culture medium (containing DMEM-F12 medium 39.2 ml, 1×B27 800 ul, 0.2 mg/ml bEGF 4 ul, and 0.2 mg/ml FGF 8 ul), and then gently blown into individual cells. The cells were centrifuged at 700 rcf for 5 min and the supernatant was discarded. The neural precursor cell culture medium was added, and the cells were inoculated and cultured in a 24-well cell culture plate. After 3-4 days of cell growth, the next step of detection was performed when the cells were proliferated to a sufficient number.

When the cultured primary neural precursor cells were proliferated and grown to a certain size of neurospheres, the neurospheres were blown into individual cells and inoculated in a 24-well cell culture plate lined with adhesive glass discs. The cells were grown in neural precursor cell culture medium supplemented with ADT-OH (80 μmol/L) or control solute DMSO for 24 h, respectively. The neural precursor cell culture medium was changed to a differentiation medium (containing DMEM/F12 39 ml, 0.5% FBS, 1×B27

800 ul) with ADT-OH or DMSO to induce the differentiation of neural precursor cells. Then, the next step of detection was performed.

The cultured cells were fixed with 4% PFA for 15 min, and washed three times with 0.01 M PBS, and then immunofluorescence staining was performed with Tuj1, GFAP, MBP, and caspase3 antibodies. The plate was blocked with a DAPI-containing blocking agent (Vector Labs, H-1400), observed and photographed under a Zeiss fluorescence microscope. Tuj1-positive neurons GFAP-positive astrocytes, MBP-positive oligodendrocytes and DAPI-positive cells were counted using ImageJ and adobe photoshop, respectively. The rate of positive cells to all DAPI-positive cells was calculated.

(2) The cells were fixed with 4% PFA after 5 days of differentiation in the differentiation medium, and immunofluorescently stained with the neuron-specific antibody Tuj1. After staining, images were collected under a fluorescence microscope, and the rates of neurons to all DAPI-positive cells in each group were statistically calculated.

The results are shown in FIG. 1. The statistical results show that compared with the DMSO control group, more cells are differentiated into neurons in the ADT-OH group (FIGS. 1A and B), and the neurons have longer axons (FIGS. 1A and C). The above data shows that ADT-OH can promote the differentiation of neural precursor cells into neurons and the growth of axons.

(3) The cells were fixed in 4% paraformaldehyde after 5 days of differentiation in the differentiation medium of neural precursor cells, and immunofluorescently stained with oligodendrocyte-specific antibody MBP. The rate of MBP positive cells to all DAPI-positive cells was statistically calculated.

Figure 2:
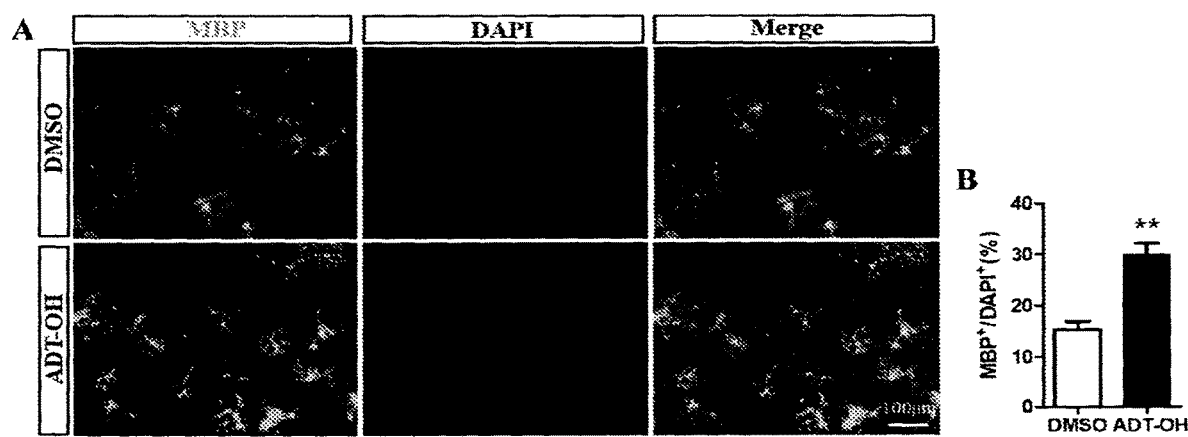
FIG. 2 shows the effect of ADT-OH on the differentiation of oligodendrocytes, where A shows staining of MBP cells; and B shows a statistical graph of oligodendrocyte differentiation ratio.

The results are shown in FIG. 2. The statistical results show that compared with the DMSO control group, more cells are differentiated into oligodendrocytes in the ADT-OH group (FIGS. 2A and B). The above data shows that ADT-OH can promote the differentiation of neural precursor cells into oligodendrocytes.

(4) The cells were fixed in 4% paraformaldehyde after 8 days of differentiation in the differentiation medium of neural precursor cells, and immunofluorescently stained with astrocyte-specific antibody GFAP. The rate of GFAP positive cells to DAPI-positive cells was statistically calculated.

Figure 3:
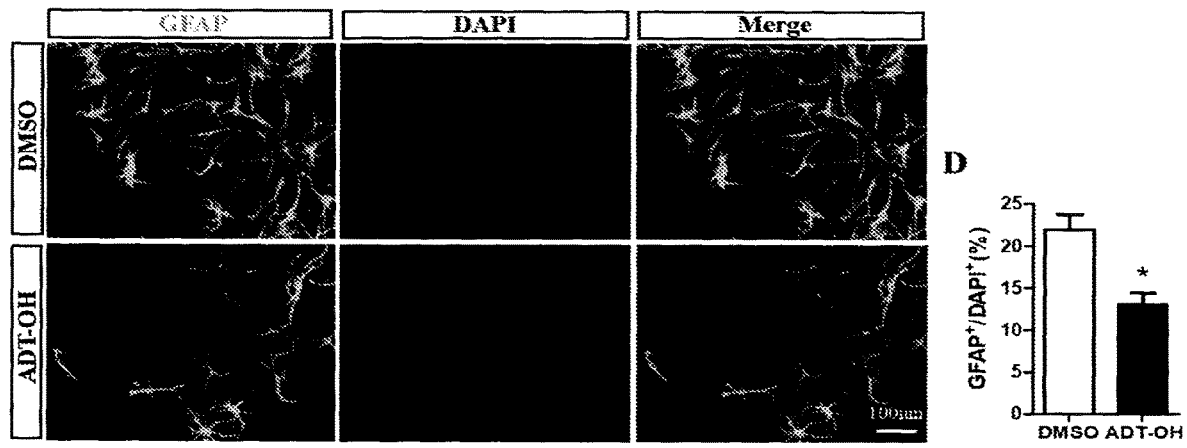
FIG. 3 shows the effect of ADT-OH on the differentiation of astrocytes, where A shows staining of GFAP cells; and B shows a statistical graph of astrocyte differentiation ratio.

The results are shown in FIG. 3. The statistical results show that compared with the DMSO control group, fewer cells in the ADT-OH group are differentiated into astrocytes (FIGS. 3A and B). The above data shows that ADT-OH can inhibit the differentiation of neural precursor cells into astrocytes.

Example 2

Figure 4:
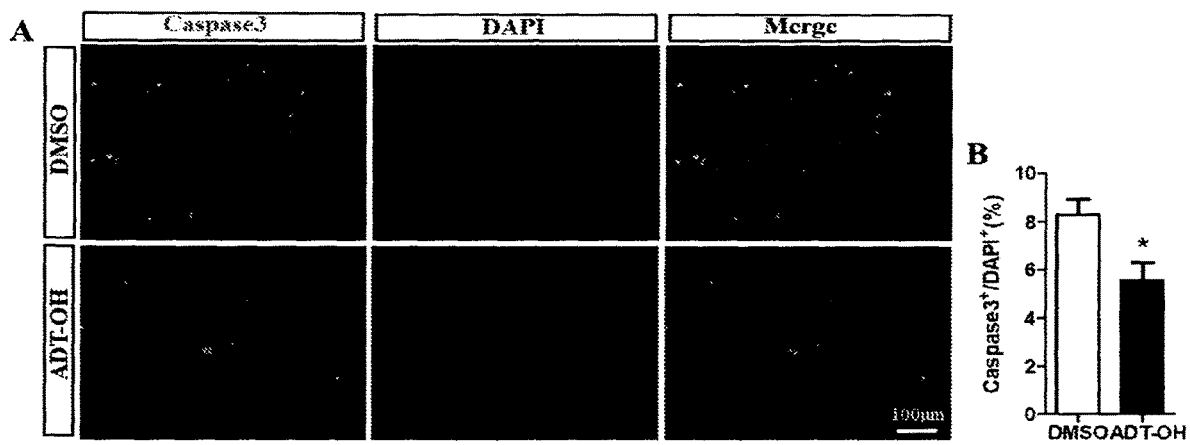
FIG. 4 shows the effect of ADT-OH on the differentiation of astrocytes, where A shows staining of caspase3 cells; and B shows a statistical graph of apoptosis of neural precursor cells.

The isolated primary neural precursor cells were cultured for 3-4 days, and the neurospheres were blown into individual cells. and inoculated in a 24-well cell culture plate lined with adhesive glass discs. The cells were grown in neural precursor cell culture medium supplemented with ADT-OH (80 µmol/L) or control solute DMSO for 3 days, respectively, and then stained with apoptosis-specific antibody caspase3. Images were collected under a fluorescence microscope, and the rate of caspase3 positive cells to all DAPI-positive cells were statistically calculated. The statistical results show that compared with the DMSO control group, fewer cells are apoptotic in the ADT-OH group (FIGS. 4A and B). The above data shows that ADT-OH protects neural precursor cells from apoptosis.

Therefore, compared with the DMSO control group, the rate of differentiation into neutrons in the ADT-OH group is increased by 57.69%, the rate of differentiation into oligodendrocytes is increased by 87.5%, and the rate of differentiation into astrocytes is reduced by 69.2%. Moreover, ADT-OH can also effectively prevent the apoptosis of neural precursor cells. Compared with the DMSO control group, apoptosis is reduced by 44.8% in the ADT-OH group.

Example 3

The dorsal side of the mouse spinal cord was hit by a falling heavy object, to establish a mouse model of spinal cord injury. The specific operations were as follows. The mice were anesthetized, and cut at a right central position of the back to removal the lamina, and expose the spinal dura. Then a heavy object was allowed to freely drop from a height, and hit the spinal cord, to cause spinal cord injury. The ADT-OH treated neural precursor cells were then transplanted into the site of spinal cord injury under a stereomicroscope. The differentiation of neural precursor cells, cell survival and axon growth of neutrons at the injury site were detected one month later to assess the effect on spinal cord repair.

The results show that one month after implantation of ADT-OH treated neural precursor cells, the numbers of neurons and oligodendrocytes are greatly increased at the site of spinal cord injury in mice, the number of astrocytes is significantly lower than that of neurons or oligodendrocytes, axons are also elongated to some extent, and the spinal cord injury is significantly improved.

Apparently, the above-described embodiments are merely examples provided for clarity of description, and are not intended to limit the implementations of the present invention. Other variations or changes can be made by those skilled in the art based on the above description. The embodiments are not exhaustive herein. Obvious variations or changes derived therefrom also fall within the protection scope of the present invention.

What is claimed is:

1. A method for in-vitro differentiation of neural precursor cells, comprising:
   providing a slow-releasing hydrogen sulfide organic donor ADT-OH;
   culturing the neural precursor cells in a neural precursor cell culture medium containing the ADT-OH for 1-3 days, a concentration of the ADT-OH in the neural precursor cell culture medium containing ADT-OH being 70-90 µmol/L, the neural precursor cell culture medium being DMEM-F12 medium containing B27, bEGF and FGF; and
   inductively culturing the neural precursor cells in a differentiation medium containing the slow-releasing hydrogen sulfide organic donor ADT-OH for 5-8 days, a concentration of the ADT-OH in the differentiation medium containing the ADT-OH being 70-90 µmol/L, the differentiation medium being DMEM-F12 medium containing FBS and B27.

2. The method according to claim 1, wherein the slow-releasing hydrogen sulfide organic donor ADT-OH is used to induce the differentiation of neural precursor cells into neurons.

3. The method according to claim 1, wherein the slow-releasing hydrogen sulfide organic donor ADT-OH is used to promote the axonal growth of neurons.

4. The method according to claim 1, wherein the slow-releasing hydrogen sulfide organic donor ADT-OH is used to induce the differentiation of neural precursor cells into oligodendrocytes.

5. The method according to claim 1, wherein the slow-releasing hydrogen sulfide organic donor ADT-OH is used to inhibit the differentiation of neural precursor cells into astrocytes.

6. The method according to claim 1, wherein the neural precursor cells are neural precursor cells in the subventricular zone in the embryonic stage.

7. A method for inducing the differentiation of neural precursor cells, comprising steps of:
  culturing the neural precursor cells in a neural precursor cell culture medium containing ADT-OH for 1-3 days, and then inductively culturing in a differentiation medium containing ADT-OH for 5-8 days;
  wherein the concentration of ADT-OH in the neural precursor cell culture medium containing ADT-OH is 70-90 µmol/L, the concentration of ADT-OH in the differentiation medium containing ADT-OH is 70-90 µmol/L, the neural precursor cell culture medium is DMEM-F12 medium containing B27, bEGF and FGF, and the differentiation medium is DMEM-F12 medium containing FBS and B27.

8. The method according to claim 7, wherein a tissue is taken from the subventricular zone in the embryonic stage, trypsinized, and terminated with the neural precursor cell culture medium, to obtain free neural precursor cells; and the pellet is collected, added to the neural precursor cell culture medium, then inoculated in a cell culture plate and cultured for 3-4 days, to obtain the neural precursor cells.

* * * * *